Dec. 18, 1956  F. A. MORRIS  2,774,255
HYDRAULIC VARIABLE SPEED TRANSMISSION
Filed Jan. 11, 1954  4 Sheets-Sheet 2

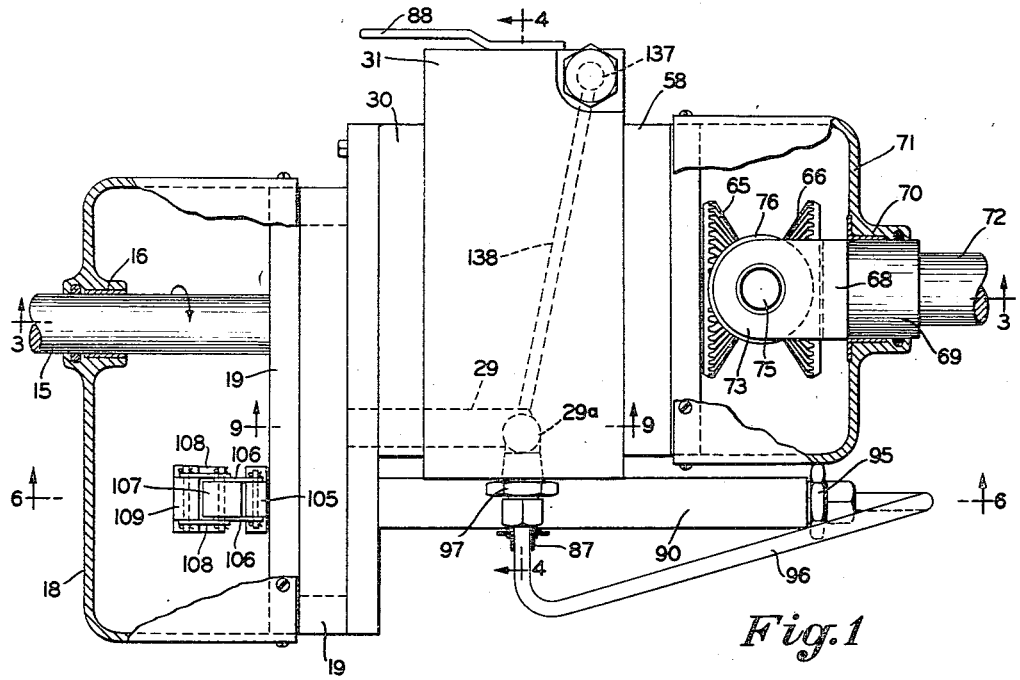

INVENTOR.
Frank A. Morris
BY
Frease & Bishop
ATTORNEYS

Dec. 18, 1956  F. A. MORRIS  2,774,255
HYDRAULIC VARIABLE SPEED TRANSMISSION
Filed Jan. 11, 1954  4 Sheets-Sheet 3

INVENTOR.
Frank A. Morris
BY Frease & Bishop
ATTORNEYS

Dec. 18, 1956 F. A. MORRIS 2,774,255
HYDRAULIC VARIABLE SPEED TRANSMISSION
Filed Jan. 11, 1954 4 Sheets-Sheet 4

INVENTOR.
Frank A. Morris
BY Frease & Bishop
ATTORNEYS

United States Patent Office 2,774,255
Patented Dec. 18, 1956

2,774,255

HYDRAULIC VARIABLE SPEED TRANSMISSION

Frank A. Morris, Malvern, Ohio

Application January 11, 1954, Serial No. 403,094

14 Claims. (Cl. 74—687)

The invention relates to hydraulic transmission for application where requirements are for speed control and/or torque multiplication, and more particularly to a variable speed transmission with automatic control.

The object of the invention is to provide a hydraulic transmission wherein a pump delivers oil through a control valve to two gear motors coaxially connected to the bevel gears of a differential unit.

Another object is to provide such a hydraulic transmission having an open type hydraulic system wherein oil is pumped from and returned to a reservoir not in itself under pressure.

A further object is to provide such a hydraulic transmission in which the control valve is so constructed that through rotary movement thereof the gear motors may be both driven in the same direction, or one motor may be stopped completely, or one motor may be permitted to counterrotate at a speed proportional to the amount of oil admitted to that motor.

A still further object is to provide such a hydraulic transmission in which a 180 degree rotation of the control valve reverses the flow of oil through the gear motors so as to reverse the rotation of the output shaft.

Another object is to provide such a hydraulic transmission having an automatic control comprising a centrifugal ball head assembly attached to and rotating with the driven gear of the pump.

A further object is to provide a hydraulic transmission of this type in which the ball head assembly will interpret the speed of the engine and thereby its torque capacity, transmitting the force generated to a compression type spring which actuates a rack bar meshing with a gear mounted upon the control valve.

A still further object is to provide a hydraulic transmission having an automatic control of the type referred to in which the spring of the ball head assembly, through the rack bar and gear referred to, tends to hold the control valve in the position at which the transmission is operating at its highest ratio, with pressure oil passing through both gear motors so as to cause them both to rotate in the same direction and at the same speed, so that the differential bevel gears rotate together with little or no rotation of the bevel pinions.

It is also an object of the invention to provide such an automatic control for hydraulic transmission, in which a plunger is operated by oil pressure to move the rack bar toward the centrifugal ball head, against the spring compression, for rotating the control valve to that limit where the gear motors are driven in opposite directions, so that the output shaft is stationary and pressure built up in the passages is only sufficient to overcome the resistance in the apparatus.

The above and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings, in which:

Fig. 1 is a top plan view of a hydraulic, variable speed, transmission embodying the invention, parts being broken in section for the purpose of illustration;

Fig. 2 is a horizontal, sectional view through the hydraulic transmission, taken on the line 2—2, Fig. 3;

Figure 3:
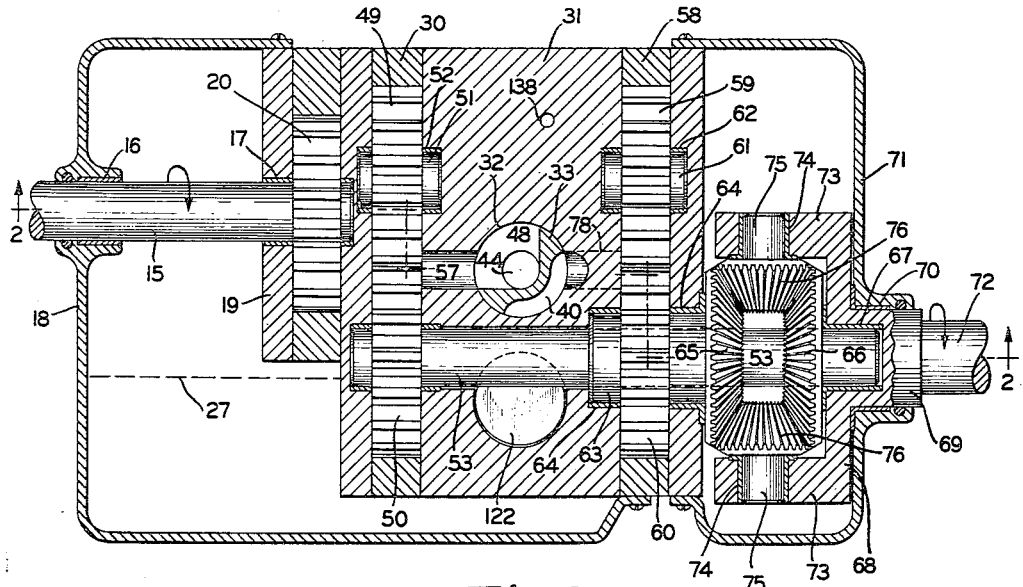
Fig. 3 is a vertical, longitudinal section through the hydraulic transmission, taken on the line 3—3, Figs. 1 and 2.

Referring now more particularly to the embodiment of the invention shown in the drawings, in which similar numerals refer to similar parts throughout, the input or drive shaft is indicated at 15 and adapted to be driven in the direction of the arrows shown in the drawings by means of an engine or motor (not shown) to which it is operatively connected. This shaft is journalled through suitable bearings 16 and 17 in the oil reservoir 18 and gear pump housing 19 respectively.

One gear 20 of the gear pump is fixed upon the shaft 15, as by a key 21, and the other gear 22 of the pump is fixed upon a tubular shaft 23 journalled in bearings 24 in the pump housing 19. A feed tube 25 depends from the inlet port 26 of the gear pump and extends into the oil reservoir 18 at a point below the oil level therein as indicated at 27 in Figs. 3 and 6.

Figures 4, 5:
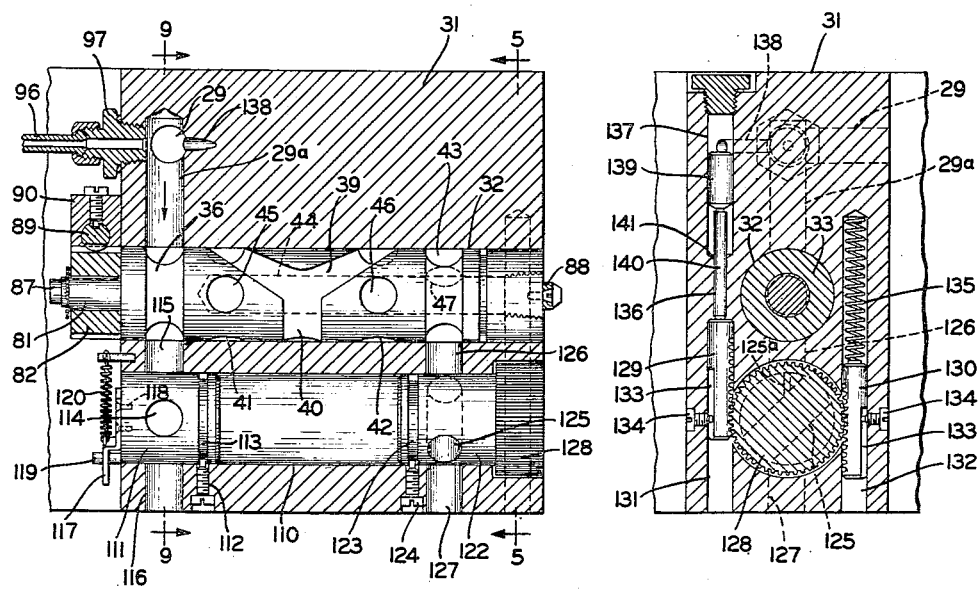
Fig. 4 is a vertical, transverse section taken on the line 4—4, Figs. 1 and 2.
Fig. 5 is a fragmentary, vertical, longitudinal section taken on the line 5—5, Fig. 4.
Figure 9:
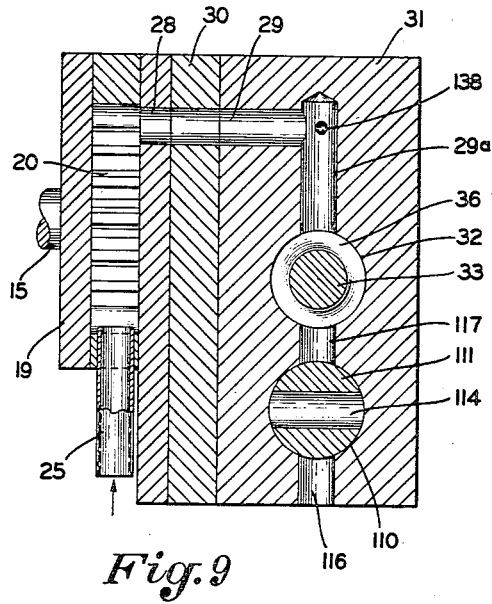
Fig. 9 is a fragmentary, longitudinal, vertical section taken on the line 9—9, Figs. 1 and 4.
Figure 10:
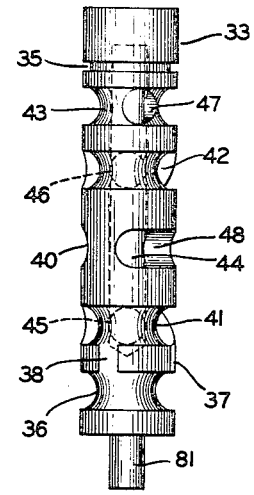
Fig. 10 is a detached view of the control valve showing the opposite side thereof from that shown in Fig. 4.
Figure 11:
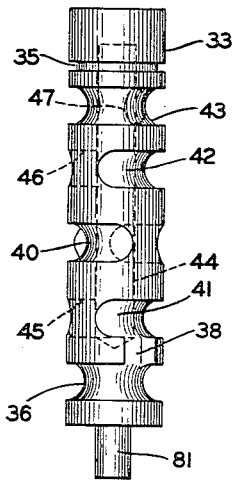
Fig. 11 is another detached elevation of the control valve showing the opposite side thereof from that shown in Fig. 2.
Figure 12:
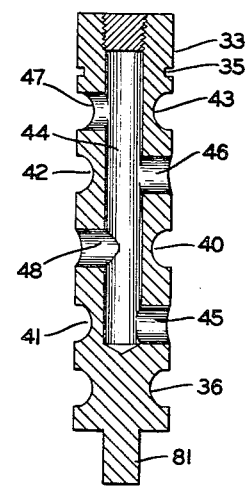
Fig. 12 is a longitudinal, sectional view through the control valve.

The outlet port 28 of the pump housing communicates with a horizontal passage 29 located through the gear motor housing 30 and the valve housing 31 and extends downwardly through said valve housing, as indicated at 29a in Figs. 4 and 9, where it communicates with one end portion of the control valve chamber or bore 32.

The control valve, indicated generally at 33, is rotatably mounted within the valve chamber 32 and held against longitudinal movement therein by means of a set screw 34 in the valve housing 31, the end of the set screw being received within a peripheral groove 35 in the valve 33.

The control valve 33 is of generally cylindrical shape, having a peripheral annular inlet collector groove 36 near one end thereof which communicates, through the notches 37 and 38, with a V-shape peripheral groove 39 having the extension 40 at its apex and the extensions 41 and 42 at opposite ends.

Near the opposite end of the valve 33 from the inlet groove 36 is a peripheral annular outlet collector groove 43. The central longitudinal bore 44 is located within the valve 33 and communicates with the radial exhaust ports 45 and 46 located through one side of the valve and with the radial exhaust port 47 located through the opposite side of the valve within the exhaust groove 43 therein.

A central, transversely elongated exhaust port 48 also communicates with the central bore 44 of the valve 33.

In the gear motor housing 30 is located a gear motor comprising the upper and lower gears 49 and 50. The upper gear 49 is fixed upon a short shaft 51 journalled in bearings 52 in the housing and the lower gear 50 is fixed upon a shaft 53 journalled through the valve housing 31 for a purpose to be later described.

Figure 8:
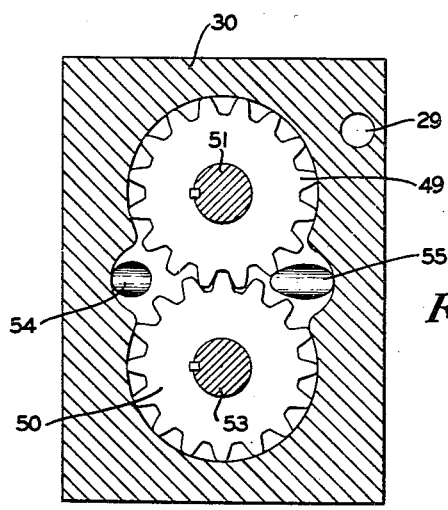
Fig. 8 is a section through one of the gear motors taken on the line 8—8, Fig. 2.

Inlet and outlet ports 54 and 55 are located in the central portion of the gear motor housing 30 at opposite sides of the gears as best shown in Fig. 8. The inlet port 54 communicates with a horizontal, angularly disposed passage 56 which communicates at its opposite end with the control valve chamber 32, and the outlet port 55 of the gear motor housing communicates with a horizontal, angularly disposed passage 57, the other end of which communicates with the control valve chamber 32.

On the opposite side of the valve housing from the gear motor above described is located a second gear motor of the same construction, a motor housing 58 being provided therefor. This second gear motor comprises the upper and lower gears 59 and 60, the upper gear 59 being mounted upon a shaft 61 journalled in suitable bearings 62 and the lower gear 60 being fixed upon a tubular shaft 63 journalled in bearings 64.

One bevel gear 65 of a differential unit is fixed upon the tubular shaft 63 and the other bevel gear 66 of the differential unit is fixed upon the shaft 53, which extends through the tubular shaft 63 and has its outer end journalled, as at 67, in the arm 68 of the differential unit.

This arm of the differential unit is provided with a journal portion 69, journalled in a bearing 70 in the differential unit housing 71, and the output shaft 72 is coaxially attached thereto. The arm 68 of the differential unit has the diametrically opposed angular extensions 73 in which are journalled, as indicated at 74, the shafts 75 of the differential bevel pinions 76.

The inlet port 77 of the gear motor housing 58 communicates with the horizontal, angularly disposed passage 78, located through the valve housing 31 and communicating at its opposite end with the valve chamber 32, and the angularly disposed horizontal passage 79 in the valve housing 31 communicates at opposite ends with the outlet port 80 of the gear motor housing 58 and with the valve chamber 32.

The control valve 33 is provided at one end with a reduced neck 81 upon which is journalled the pinion 82 having diametrically opposed, longitudinal bores 83 therein, within which are located coil springs 84 normally urging the balls 85 into recesses 86 in the adjacent end of the valve 33. A cap screw 87 in the outer end of the neck 81 retains the pinion 82 upon the neck 81 of the valve.

At the opposite end of the control valve 33 is fixed a manually operable lever 88 for rotating the valve upon its axis, said lever being attached, by any suitable linkage (not shown), to an operating pedal or the like located conveniently for the operator.

A rack bar 89, slidably mounted within a tubular housing 90, engages the upper side of the pinion 82. A longitudinal groove 91 is provided in the top of the rack bar 89, and the end of the set screw 92 is received therein for limiting movement of the rack bar in radial directions.

A barrel 93 is fixed within one end of the housing 90, and a plunger 94 is longitudinally slidably mounted within the barrel. The outer end of the barrel 93 is connected, through the fitting 95, with a tube 96, the other end of which is connected by fitting 97 with the passage 29 in the housing 31.

The centrifugal ball head assembly comprises a tubular shaft 98 closed at its outer end and longitudinally slidably mounted within the tubular shaft 23 of the motor gear 22. A coil spring 99 is located within the tubular shaft 98, between the closed outer end 100 thereof and the closed end 101 of the relatively short tubular cap 102 which is also slidably mounted within the tubular shaft 23 of the gear motor. A disc 103 is rotatably mounted within the outer end of the tubular cap 102, being preferably provided with ball bearings 104.

Lugs 105 are formed upon the outer end of the tubular shaft 23, at diametrically opposed points thereon, to which are pivotally attached one end of spaced pairs of links 106. The other end of these links are pivotally attached to the weights 107, to which are also pivotally attached one end of spaced pairs of links 108. The other end of the links 108 are pivotally attached to lugs 109 formed at the outer end of the tubular shaft 98.

Figure 6:
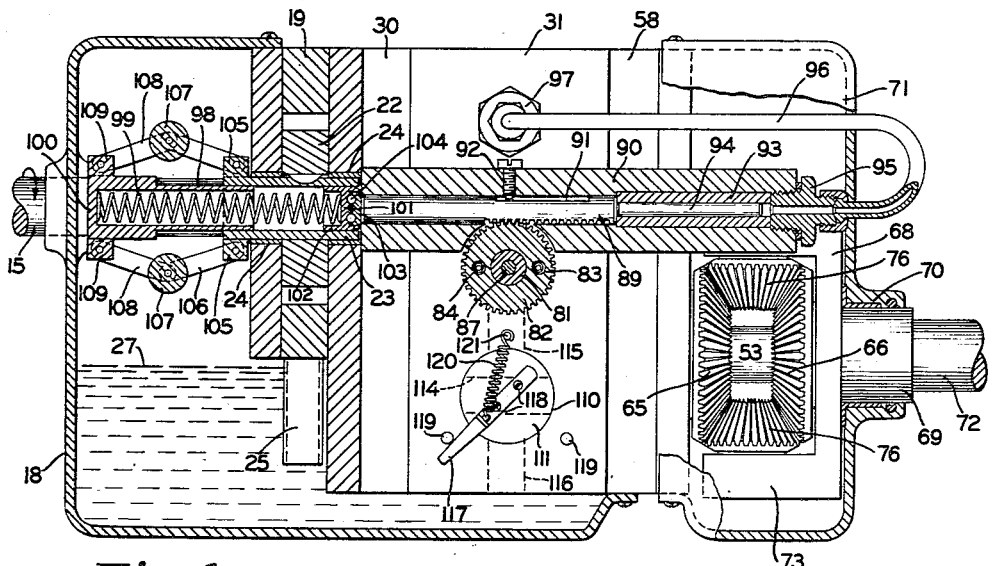
Fig. 6 is a vertical, longitudinal section taken on the line 6—6, Fig. 1.

As best shown in Fig. 6, the spring 99 tends to normally hold the ball head assembly in the extended position. This spring bears against the rack bar 89, and through the gear 82, tends to hold the control valve 33 in the position at which the transmission is operating at its highest ratio, that is, with oil under pressure being admitted to and exhausted from both gear motors, as shown in Fig. 2.

In this position of the control valve both gear motors are rotating in the same direction and at the same speed, and the differential bevel gears 65 and 66 are rotating together in the same direction and at the same speed, with little or no rotation of the bevel pinions 76.

A transverse bore 110 is provided in the valve housing 31, below and parallel to the bore 32 in which the control valve 33 is located. Rotatably mounted in one end of the bore 110, is a manually operable pump by-pass valve 111, which is held against longitudinal movement in the bore by means of a screw 112 engaging in the annular groove 113 in the valve 111.

The pump by-pass valve 111 has a diametric passage 114 therethrough, which is located in a vertical plane passing through the passage 115 in the valve housing 31, which communicates with the inlet collector groove 36 of the control valve 33. A discharge passage 116 is formed in the valve housing 31 below the pump by-pass valve 111.

For the purpose of manually oscillating the pump by-pass valve 111, to move the diametric passage 114 therein into and out of alignment with the passages 115 and 116 in the valve housing 31, a lever 117 is fixed to the pump by-pass valve, as by screws 118.

This lever may be connected by any suitable linkage (not shown) to a manually operable pedal or the like located conveniently for operation by the driver. Stop lugs 119 protrude from the valve housing 31, on opposite sides of the pump by-pass valve 111, for limiting the movement of the lever 117 in each direction, and a spring 120 is connected at one end to the lever 117 and at its other end to a stud 121 on the valve housing, directly above the axis of the pump by-pass valve.

Thus, as the lever 117 is moved in either direction, the spring 120 will pass over center and move the lever into contact with the adjacent lug 119. With the parts in the position shown in Figs. 4 and 9 the diametric passage 114 is located substantially horizontal, and out of communication with the passages 115 and 116 in the valve housing.

When the pump by-pass valve 111 is rotated to the opposite position, with the lever 117 in contact with the lug 119 at the right as viewed in Fig. 6, the diametric passage 114 in the pump by-pass valve will be located vertically and in communication with the passages 115 and 116.

In this latter position of the pump by-pass valve, oil from the gear pump 20—22 will pass through the passages 29 and 29a to the inlet groove 36 of the control valve 33 and be returned immediately through the passages 115, 114 and 116 to the reservoir 18 without operating the gear motors.

An anti-free wheeling device is provided and comprises a valve 122, rotatably mounted in the opposite end of the bore 110 from the pump by-pass valve 111. An annular groove 123 in the valve 122 is engaged by a screw 124 to prevent longitudinal movement of the valve 122.

The valve 122 is provided with a diametric passage 125, located in the same vertical plane as the vertical passages 126 and 127 in the valve housing 31. As best shown in Fig. 4, the passage 126 communicates with the exhaust groove 43 of the control valve 33, and the passage 127 is an exhaust or discharge passage for returning oil to the reservoir.

A gear 128 is formed upon, or fixed to, the outer end of the valve 122 and meshes on opposite sides with the rack bars 129 and 130 which are slidably mounted in the vertical bores 131 and 132 respectively.

For the purpose of preventing the rack bars 129 and 130 from rotating within their bores, each rack bar may have a longitudinal groove 133 therein, engaged by a screw 134 in the valve housing 31. A coil spring 135 is located in the bore 132, above the rack bar 130, tending to urge said rack bar downward, as shown in Fig. 5.

The bore 131 communicates at its upper end with a reduced bore 136, which in turn communicates at its upper end with an enlarged bore 137. A reduced passage forms communication between the inlet passage 29 and the upper end of the bore 137.

The plunger or piston 139 is vertically slidable within the bore 137 and is provided with the depending stem or piston rod 140 contacting the upper end of the rack bar 129. Thus when oil under pressure is admitted to the bore 137 it will force the plunger 139 downward toward its seat 141, and through the rack bar 129 and gear 128 will rotate the valve 122 toward open or exhaust position, against the compression of the spring 135.

Figure 7:
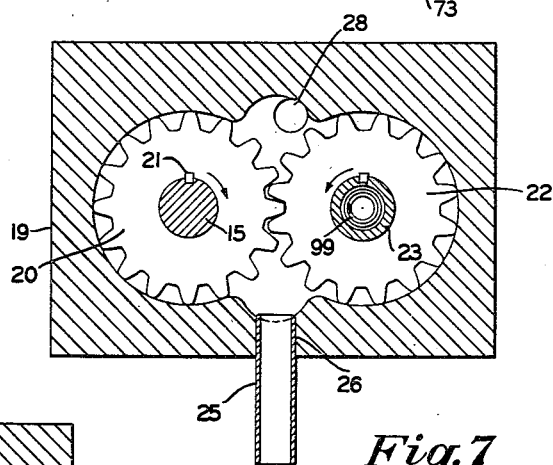
Fig. 7 is a sectional view through the gear pump taken on the line 7—7, Fig. 2.

In the operation of the improved hydraulic transmission, the input shaft is driven, in the direction of the arrows, by the engine or motor, thus driving the pump gears 20 and 22 in the direction shown in Fig. 7, pumping oil up from the reservoir through the inlet pipe 25 and discharging the oil under pressure through the discharge port 28, and through the passages 129 and 129a to the inlet groove 36 of the control valve 33.

It should be understood that the pump by-pass valve 111 has been moved to the closed position as shown in Figs. 4, 6 and 9, so as to prevent the oil from passing through the passage 115 and exhaust passage 116 and returning to the reservoir.

The control valve 33 may be assumed to be in the position shown in Fig. 2. Pressure oil thus admitted to the inlet groove 36 of the control valve will pass through the notches 37 and 38 to the V-shape groove 39, from which it passes through the inlet passage 78 and port 77 to the gear motor 59—60, and simultaneously through the inlet passage 56 and port 54 to the gear motor 49—50.

Oil will discharge from the gear motor 59—60 through the exhaust port 80 and passage 79 to the radial port 45 of the control valve 33, and thence through the central bore 44 of said valve and radial port 47 thereof to the exhaust collector groove 43 of the control valve.

At the same time, oil from the gear motor 49—50 will be discharged through the port 55 and passage 57 to the central exhaust port 48 of the control valve 33, and then through the central bore 44 and radial port 47 to the exhaust collector groove 43 of the control valve.

Oil under pressure will simultaneously be admitted from the inlet passage 29 through the reduced passage 138 to the upper end of the cylinder bore 137, urging the plunger 139 downward therein. Through the stem 140, the downward movement of the plunger 139 will move the rack bar 129 downward, rotating the valve 122 through the gear 128 thereon.

This rotation of the gear 128 will of course move the rack bar 130 upward, compressing the spring 135. The valve 122 will thus be rotated in counter-clockwise direction, as viewed in Fig. 5, aligning the diametric bore 125 therein with the discharge passages 126 and 127 in the valve housing 31.

The valve 122 will remain in this position as long as the oil pressure is maintained upon the plunger 139 to overbalance the pressure of the spring 135.

With the control valve 33 in the position shown in Fig. 2, the two gear motors 49—50 and 59—60 will be operated at the same speed and in the same direction, and the oil passing through said gear motors and returning to the exhaust collector groove of the control valve 33 will be discharged through the passages 126, 125 and 127 and returned to the reservoir 18.

With the two motor gears thus operating at the same speed and in the same direction, it will be evident that, through the shafts 53 and 63, and bevel gears 66 and 65 respectively, the output shaft will be rotated in the direction of the arrow in Fig. 3, with little or no rotation of the bevel pinions 76.

The transmission is thus operating at its highest ratio, with the control valve 33 in the position of Fig. 2, as above described. This is the first phase of operation after the pump by-pass valve 111 has been rotated from the position of Fig. 6 to that of Figs. 4 and 9.

With the engine idling at low speed, the ball head assembly will be extended, as shown in Figs. 2 and 6, by the spring 99, which exerts a force in the other direction to hold the automatic control rack bar 89 in contact with the barrel 93.

Oil under pressure in the passage 29 is admitted through the tube 96 to the barrel 93, against the outer end of the plunger 94 therein. As the oil pressure increases the plunger 94 will be moved to the left, as viewed in Fig. 6, moving the control rack bar 89 also to the left and thus, through the gear 82, rotating the control valve 33 in counter-clockwise direction.

As the control valve is rotated about 45 degrees in this direction, the radial exhaust port 45 therein will have been moved out of register with the exhaust passage 79 from the gear motor 59—60.

Although the central extension 40 of the V-shape inlet groove 39 of the control valve is at this point still in register with the inlet passage 79 of the gear motor 59—60, this gear motor will have stopped rotation since there can be no circulation of pressure oil therethrough.

In this position of the control valve 33, the end extension 42 of the V-shape inlet groove 39 thereof will be in register with the inlet passage 56 to the gear motor 49—50, and the elongated central exhaust port 48 of the control valve will be in register with the discharge passage 57 from said gear motor 49—50.

Thus all of the oil from the gear pump will be circulated under pressure through the gear motor 49—50, doubling the speed of rotation of the gear motor 49—50, and consequently the speed of the shaft 53 and bevel gear 66 of the differential unit. Through the bevel pinions 76, the output shaft 72 will remain as constant speed of rotation in the same direction.

Slight further rotation of the control valve 33 in counterclockwise direction will bring the terminal portion of end extension 41 of the V-shape inlet groove 39 of the control valve into register with the discharge passage 79 from the gear motor 59—60, while the central extension 40 of the V-shape groove remains in register with the inlet passage 78 thereof.

At this position of the control valve 33, the end extension 42 of the V-shape inlet groove of the valve remains in register with the inlet passage 56 of the gear motor 49—50, and the central exhaust port 48 of the control valve remains in register with the discharge passage 55 from the gear motor 49—50.

The gear motor 49—50 will continue to rotate in the same direction, while the gears 59—60 will start to rotate in the opposite direction, being driven in reverse direction by the action of the differential pinions 76, the speed of rotation of the gears 59—60 being in proportion to the amount of pressure oil admitted thereto through the passage 79.

This is due to the fact that throttling the oil on that side of the gear motor 59—60 will produce a negative pressure, while the other side of the gears, through the passage 78, is open to the same pressure, and an equal force which is being applied to the unthrottled gears 49—50.

The output shaft 72 will now rotate at a speed which is one-half the algebraic sum of the gear motor speeds, that is, at reduced speed and with proportional increase in torque. As the engine speed increases, the ball head assembly will, by centrifugal force, close up as shown in Fig. 1, compressing the spring 99 therein, which will move the rack bar 89 to the right, as viewed in Fig. 6. The rack bar will in turn move the plunger 94 to the right, against the oil pressure in the barrel 93.

This movement of the rack bar 89 to the right will, through the gear 82, rotate the control valve 33 in clockwise direction, returning the control valve to the position shown in Fig. 2.

In order to rotate the output shaft 72 in reverse, the pump by-pass valve 111 is manually rotated to the open position shown in Fig. 6, in which position the diametric passage 114 therein communicates with the discharge passages 115 and 116.

Then the lever 88 is manually moved one-half turn, rotating the control valve 33 180 degrees, causing the balls 85 to roll out of their seats 86 in the end of the control valve, against the compression of the springs 84, each ball dropping into the diametrically opposite seat after 180 degrees rotation of the control valve.

In this position of the control valve 33, the central extension 40 of the V-shape inlet groove of the valve will register with the passage 57 to the gear motor 49—50, admitting oil under pressure thereto, the oil being discharged from said gear motor through the passage 56 to the radial discharge port 46 of the control valve.

At the same time the end extension 41 of the V-shape inlet groove of the control valve will register with the passage 79 of the gear motor 59—60 and the passage 78 thereof will register with the central discharge port 48 of the control valve.

The pump by-pass valve 111 is then manually moved to the closed position, as in Figs. 4 and 9, and the pressure oil being passed through both gear motors in reverse direction will drive the gear motors, and through the differential unit, the output shaft 72 in reverse. Automatic operation will begin in the same manner as above described as in the forward direction.

In the operation of the hydraulic transmission, the anti-free wheeling device best shown in Figs. 4 and 5 will be operated by oil pressure upon the top of the plunger 139 forcing the rack bar 129 downward and rotating the valve 122 so as to vent the exhaust collector groove 43 of the control valve, permitting a continuous circulation of the pressure oil as above described and returning the oil to the reservoir.

The valve 122 will remain in this position during normal operation, but any tendency of the driven shaft to override and evacuate the oil passages will permit the spring 135 to move the rack bar 130 downward against the reduced oil pressure, rotating the valve 122 to closed position.

In order to limit the braking action of the device, or to simulate deceleration as produced by the braking action of the engine in conventional automotive installations, the valve 122 may have an angular drilled hole 125a communicating with the diametric bore 125 therein.

In the foregoing description, certain terms have been used for brevity, clearness and understanding, but no unnecessary limitations are to be implied therefrom beyond the requirements of the prior art, because such words are used for descriptive purposes herein and are intended be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A hydraulic variable speed transmission including an oil reservoir, an oil pump having an inlet to the reservoir, means for driving the pump, a pair of similar gear motors, a rotatable control valve between the pump and the motors, said valve having means providing circulation of oil therethrough from the pump to and from the motors to the reservoir, means including a plunger operated by oil pressure from the pump for rotating said control valve to control the flow of oil to said gear motors, a centrifugal ball head coaxially connected to the pump and having a compression spring therein counteracting the oil pressure upon the plunger.

2. A hydraulic variable speed transmission including an oil reservoir, an oil pump having an inlet to the reservoir, means for driving the pump, a pair of similar gear motors, a rotatable control valve between the pump and the motors, said valve having means providing circulation of oil therethrough from the pump to and from the motors to the reservoir, a gear upon the control valve, a rack bar engaging said gear, a plunger at one end of the rack bar, said plunger being movable against the rack bar by oil pressure from the pump for rotating the control valve to control the flow of oil to the gear motors, a centrifugal ball head coaxially connected to the pump and having a compression spring therein counteracting the oil pressure upon the plunger.

3. A hydraulic variable speed transmission including an oil reservoir, an oil pump having an inlet to the reservoir, means for driving the pump, a pair of similar gear motors, a control valve between the pump and the motors, said valve having means providing circulation of oil therethrough from the pump to and from the motors to the reservoir, an anti-free wheeling valve between the discharge side of the control valve and the reservoir, means normally urging the anti-free wheeling valve to closed position, and means operated by oil pressure from the pump for opening the anti-free wheeling valve.

4. A hydraulic variable speed transmission including an oil reservoir, an oil pump having an inlet to the reservoir, means for driving the pump, a pair of similar gear motors, a control valve between the pump and the motors, said valve having means providing circulation of oil therethrough from the pump to and from the motors to the reservoir, an anti-free wheeling valve between the discharge side of the control valve and the reservoir, spring means normally urging the anti-free wheeling valve to closed position, and means operated by oil pressure from the pump for opening the anti-free wheeling valve.

5. A hydraulic variable speed transmission including an oil reservoir, an oil pump having an inlet to the reservoir, means for driving the pump, a pair of similar gear motors, a control valve between the pump and the motors, said valve having means providing circulation of oil therethrough from the pump to and from the motors to the reservoir, a rotatable anti-free wheeling valve between the discharge side of the control valve and the reservoir, a gear upon the anti-free wheeling valve, rack bars engaging opposite sides of the gear, spring means engaging one rack bar for normally urging the anti-free wheeling valve to closed position, and a plunger operated by oil pressure from the pump and engaging the other rack bar for opening the anti-free wheeling valve.

6. A hydraulic variable speed transmission including an oil reservoir, an oil pump having an inlet to the reservoir, means for driving the pump, a pair of similar gear motors, a rotary cylindrical control valve between the pump and the gear motors, said valve having an annular inlet groove at one end communicating with the pump and an annular exhaust collector groove at its other end communicating with the reservoir, a peripheral groove or irregular contour communicating with the inlet groove and spaced exhaust ports communicating with the exhaust collector groove, there being spaced passages communicating with each side of each gear motor and the valve, and means operated by oil pressure from the pump for rotating the control valve to control the flow of oil therethrough to said gear motors.

7. A hydraulic variable speed transmission including an oil reservoir, an oil pump having an inlet to the reservoir, means for driving the pump, a pair of similar gear motors, a rotatable control valve between the pump and the motors, said valve having means providing circulation of oil therethrough from the pump to and from the motors to the reservoir, a gear upon the control valve, a rack bar engaging said gear, a plunger at one end of the rack bar, said plunger being movable against the rack bar by oil pressure from the pump for rotating the control valve to control the flow of oil to the gear motors, spring means at the other end of the rack bar counteracting the oil pressure upon the plunger, and means for adjusting the control valve relative to said gear for reversing the flow of oil through the gear motors.

8. A hydraulic variable speed transmission including an oil pump, means for driving the pump, a pair of similar fluid motors, means connecting the pump to one of said motors for rotating said one motor, differential gear, means causing the other motor of said pair to counterrotate, means for throttling the incoming oil to that motor which may counterrotate, said last-named means including a variable orifice at the incoming side of said other motor and means providing communication between the pressure side of the pump and said variable orifice, and pressure oil means opposing rotation of the counterrotating motor and comprising means providing communication between the pressure side of the pump and the outgoing side of that motor which may counterrotate.

9. A hydraulic variable speed transmission including an oil pump, means for driving the pump, a pair of similar fluid motors, means connecting the pump to one of said motors for rotating said one motor, differential gear, means causing the other motor of said pair to counterrotate, means for throttling the incoming oil to that motor which may counterrotate, said last-named means including a variable orifice at the incoming side of said other motor and means providing communication between the pressure side of the pump and said variable orifice, pressure oil means opposing rotation of said counterrotating motor and comprising means providing communication between the pressure side of the pump and the outgoing side of that motor which may counterrotate, and means operated by oil pressure from the pump for operating said variable orifice.

10. A hydraulic variable speed transmission including an oil reservoir, an oil pump having an inlet to the reservoir, means for driving the pump, a pair of similar fluid motors, means connecting the pump to either of said motors for rotating the motor so connected, differential gear, means causing the other motor of said pair to counterrotate, means for throttling the incoming oil to that motor which may counterrotate, said last-named means including a variable orifice at the incoming side of said other motor and means providing communication between the pressure side of the pump and said variable orifice, pressure oil means opposing rotation of said counterrotating motor and comprising means providing communication between the pressure side of the pump and the outgoing side of that motor which may counterrotate, and means whereby both motors may be fluid driven together in either direction.

11. A hydraulic variable speed transmission including an oil pump, means for driving the pump, a pair of similar fluid motors, means connecting the pump to one of said motors for rotating said one motor, differential gear, means causing the other motor of said pair to counterrotate, means for throttling the incoming oil to that motor which may counterrotate, said last-named means including a variable orifice at the incoming side of said counterrotating motor and means providing communication between the pressure side of the pump and said variable orifice, pressure oil means opposing rotation of said counterrotating motor and comprising means providing communication between the pressure side of the pump and the outgoing side of that motor which may counterrotate, and means including a centrifugal ballhead driven from the pump opposing means operated by oil pressure from the pump for operating said variable orifice.

12. A hydraulic variable speed transmission including an oil reservoir, an oil pump having an inlet to the reservoir, means for driving the pump, a by-pass valve between the pressure side of the pump and the reservoir, a pair of similar fluid motors, means connecting the pump to one of said motors for rotating said one motor, differential gear, means causing the other motor of said pair to counterrotate at the same, or at a lesser speed, than said fluid driven motor, means for throttling the incoming oil to that motor which may counterrotate, said last-named means including a variable orifice at the incoming side of said motor and means providing communication between the pressure side of the pump and said variable orifice, and pressure oil means opposing rotation of the counterrotating motor and comprising means providing communication between the pressure side of the pump and the outgoing side of that motor which may counterrotate.

13. A hydraulic variable speed transmission including an oil pump, means for driving the pump, a pair of similar fluid motors, means connecting the pump to one of said motors for rotating said one motor, differential gear, means causing the other motor of said pair to counterrotate at a speed equal to, or less than, the speed of said fluid driven motor, means for throttling the incoming oil to that motor which may counterrotate, said last-named means including a throttling valve at the incoming side of said counterrotating motor and means providing communication between the pressure side of the pump and the throttling valve, and pressure oil means opposing rotation of the counterrotating motor and comprising means providing communication between the pressure side of the pump and the outgoing side of that motor which may counterrotate.

14. A hydraulic variable speed transmission including an oil reservoir, an oil pump having an inlet to the reservoir, means for driving the pump, a pair of similar fluid motors, means connecting the pump to one of said motors for rotating said one motor, differential gear, means causing the other motor of said pair to counterrotate at variable relative speed, means for throttling the oil to the inlet side of that motor which may counterrotate, said last-named means including a variable orifice at the incoming side of said counterrotating motor and means providing communication between the pressure side of the pump and said variable orifice, pressure oil means opposing rotation of the counterrotating motor and comprising means providing communication between the pressure side of the pump and the outgoing side of that motor which may counterrotate, an anti-freewheeling valve between the discharge side of the fluid driven motors and the reservoir, means operated by oil pressure from the pump for opening said valve, and spring means for closing said valve.

(References on following page)

References Cited in the file of this patent

UNITED STATES PATENTS

| | | |
|---|---|---|
| 1,235,132 | Gaylord | July 31, 1917 |
| 1,294,121 | Lape | Feb. 11, 1919 |
| 1,926,692 | Tarbox | Sept. 12, 1933 |
| 1,987,698 | Montelius | Jan. 15, 1935 |
| 2,125,513 | Martin | Aug. 2, 1938 |
| 2,171,146 | Montelius | Aug. 29, 1939 |
| 2,190,122 | Mohler | Feb. 13, 1940 |
| 2,370,526 | Doran | Feb. 27, 1945 |

FOREIGN PATENTS

| | | |
|---|---|---|
| 9,519 | Great Britain | Apr. 19, 1911 |
| 13,488 | Great Britain | Aug. 8, 1913 |